US012671170B2

(12) United States Patent
Fabrega Sanchez et al.

(10) Patent No.: US 12,671,170 B2
(45) Date of Patent: Jun. 30, 2026

(54) MULTI-BAND ANTENNA SUPPORT

(71) Applicant: QUALCOMM Incorporated, San Diego, CA (US)

(72) Inventors: Jorge Fabrega Sanchez, San Diego, CA (US); Chinmaya Mishra, San Diego, CA (US); Darryl Sheldon Jessie, San Diego, CA (US); Bhushan Shanti Asuri, San Diego, CA (US); Allen Minh-Triet Tran, Rancho Santa Fe, CA (US); Mohammad Ali Tassoudji, San Diego, CA (US); Jeongil Jay Kim, San Diego, CA (US); Gurkanwal Singh Sahota, Rancho Santa Fe, CA (US); Kevin Hsi-Huai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/321,879

(22) Filed: May 23, 2023

(65) Prior Publication Data

US 2024/0396205 A1 Nov. 28, 2024

(51) Int. Cl.

*H01Q 1/00* (2006.01)
*H01Q 1/24* (2006.01)

(Continued)

(52) U.S. Cl.

CPC ............. *H01Q 1/243* (2013.01); *H01Q 5/307* (2015.01); *H01Q 9/0421* (2013.01); *H01Q 21/08* (2013.01)

(58) Field of Classification Search

CPC .......... H01Q 1/243; H01Q 5/307; H01Q 5/42; H01Q 1/2283; H01Q 9/0407; H01Q 9/0421; H01Q 9/42; H01Q 21/08; H01Q 21/24

(Continued)

(56) References Cited

U.S. PATENT DOCUMENTS

| | | | |
|---|---|---|---|
| 2017/0093042 A1 | 3/2017 | Mcmichael et al. |
| 2019/0252800 A1 | 8/2019 | Yetisir et al. |

(Continued)

FOREIGN PATENT DOCUMENTS

| | | |
|---|---|---|
| CN | 206332180 U | 7/2017 |
| CN | 109273829 B | 1/2021 |
| KR | 20080021194 A | 3/2008 |

OTHER PUBLICATIONS

IP.com search History (Year: 2025).*
International Search Report and Written Opinion—PCT/US2024/024176—ISA/EPO—Jun. 27, 2024.

*Primary Examiner* — Moustapha Diaby
(74) *Attorney, Agent, or Firm* — Smith Tempel Blaha LLC/Qualcomm

(57) ABSTRACT

A method of transducing signals includes: transducing first signals, of frequencies above at least 24 GHz, between first wireless signals and first guided signals, using a plurality of first antenna elements comprising at least one first substrate and at least one ground conductor; and transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for (Continued)

wireless transmission, or configured to process wirelessly-received signals, or a combination thereof.

27 Claims, 10 Drawing Sheets

(51) Int. Cl.

| | |
|---|---|
| ***H01Q 5/307*** | (2015.01) |
| ***H01Q 9/04*** | (2006.01) |
| ***H01Q 21/08*** | (2006.01) |

(58) Field of Classification Search
USPC .......................................................... 455/575.7
See application file for complete search history.

(56) References Cited

U.S. PATENT DOCUMENTS

| | | | | |
|---|---|---|---|---|
| 2020/0036083 | A1* | 1/2020 | Kim | H01Q 5/25 |
| 2020/0153086 | A1* | 5/2020 | Park | H01Q 9/0407 |
| 2020/0186180 | A1* | 6/2020 | Park | H01Q 5/307 |
| 2020/0227824 | A1 | 7/2020 | Abdalla et al. | |
| 2020/0403322 | A1* | 12/2020 | Ryu | H01Q 21/08 |
| 2021/0005967 | A1 | 1/2021 | Sudo et al. | |
| 2021/0057812 | A1 | 2/2021 | Yun et al. | |
| 2021/0126341 | A1* | 4/2021 | Mizunuma | H01Q 1/526 |
| 2021/0175609 | A1 | 6/2021 | Ryoo et al. | |
| 2022/0045442 | A1* | 2/2022 | Fabrega Sanchez | H01Q 5/42 |
| 2022/0328971 | A1 | 10/2022 | Sudo et al. | |
| 2022/0336967 | A1* | 10/2022 | Park | H01Q 25/001 |
| 2022/0393365 | A1 | 12/2022 | Wu et al. | |
| 2023/0216173 | A1* | 7/2023 | Chang | H01Q 1/2283 343/702 |
| 2023/0216202 | A1* | 7/2023 | Park | H01Q 1/523 343/893 |
| 2023/0238686 | A1* | 7/2023 | Kim | H01Q 1/243 343/702 |
| 2024/0429607 | A1 | 12/2024 | Fabrega Sanchez | |

* cited by examiner

MULTI-BAND ANTENNA SUPPORT

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support various functionality such as communication over a range of frequencies, reception of Global Navigation Satellite System (GNSS) signals, also called Satellite Positioning Signals (SPS signals), etc.

With several antennas disposed in a single wireless communication device, available volume for antennas is at a premium. For example, smartphones may have numerous antennas (e.g., eight antennas, 10 antennas, or more) with very limited volume due to the size of devices that consumers desire. Consequently, antenna assemblies (e.g., modules) may be limited to very small volumes, e.g., with widths of 4 mm or less.

Despite the volume restrictions for antennas, desired functionality of the antennas continues to increase. With the advent of $5^{th}$ generation (5G) of wireless communication technology, mmW (millimeter-wave) phased array antennas have received extensive attention to address the propagation loss and aperture blockage hurdles by introducing higher antenna gain and beamforming features. Multiple-input-multiple-output (MIMO) systems is one of the key enablers of 5G technology to increase the spectral efficiency and system capacity by effectively streaming the transmit/receive data with two orthogonally polarized signals (cross-polarized signals) in desired directions. The trend in consumer electronics is to develop RF assemblies (radio frequency assemblies) with small form factors which can be easily accommodated within the limited space of the emerging smart devices including cell phones and tablets. The physical requirements of antennas make maintaining or improving performance (e.g., in terms of coverage, latency, and quality of service over desired coverage area) difficult.

Forthcoming smart devices will be equipped with 5G technology and may be configured to operate over a wide range of frequencies. For example, currently allocated spectrum for 5G includes 0.41 GHz-7.125 GHz and 24.25 GHz-52.6 GHz, including five popular bands n258 (24.25-27.5 GHz), n261 (27.5-28.35 GHz), n257 (26.5-29.5 GHz), n260 (37.0-40.0 GHz), and n259 (39.5-43.5 GHz). Further, frequencies from 7.1 GHz to 24.25 GHz are receiving interest, in particular the 13 GHz band (12.75 GHz-13.25 GHz).

SUMMARY

An example user equipment (UE) antenna system includes: an active component set configured to provide signals for wireless transmission, or configured to process wirelessly-received signals, or a combination thereof; a plurality of first antenna elements communicatively coupled to the active component set and configured to transduce first signals, of frequencies above at least 24 GHz, between first wireless signals and first guided signals, the plurality of first antenna elements comprising at least one ground conductor and at least one first substrate, each of the plurality of first antenna elements comprising a first transducer; and at least one second antenna element communicatively coupled to the active component set and configured to transduce second signals, of frequencies within at least a portion of a frequency range between 8 GHz and 24 GHz, between second wireless signals and second guided signals, each of the at least one second antenna element comprising a second transducer disposed on a second substrate that at least partially overlaps the active component set and the at least one first substrate, or disposed on at least one of the at least one first substrate.

An example method of transducing signals includes: transducing first signals, of frequencies above at least 24 GHz, between first wireless signals and first guided signals, using a plurality of first antenna elements comprising at least one first substrate and at least one ground conductor; and transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof.

Another example UE antenna system includes: means for transducing first signals, of frequencies above at least 24 GHz, between first wireless signals and first guided signals, using a plurality of first antenna elements comprising at least one first substrate and at least one ground conductor; and means for transducing second signals, of frequencies within at least a portion of a frequency range between 8 GHz and 24 GHz, between second wireless signals and second guided signals, using at least one second antenna element each comprising a transducer disposed on a second substrate that at least partially overlaps the active component set and the at least one first substrate, or disposed on at least one of the at least one first substrate, the active component set being configured to provide signals for wireless transmission, or configured to process wirelessly-received signals, or a combination thereof.

DETAILED DESCRIPTION

Techniques are discussed herein for supporting multiple frequency bands in a device, e.g., millimeter-wave frequencies and sub-mm-wave frequencies (such as a 13 GHz band) in a form factor suitable for a user equipment (UE) such as a smartphone or tablet computer, although the techniques are not limited to use in such form factors. For example, a dual-polarized array of mm-wave (e.g., patch) antenna elements may be combined with one or more monopole sub-mm-wave antenna elements in a single antenna assembly and/or on a single substrate within a UE. Monopole antenna elements may be disposed at opposite ends of the array of mm-wave antenna elements. Each of one or more monopole antenna elements may be disposed on the substrate of a respective mm-wave antenna element. One or more monopole antenna elements may be disposed on an opposite side of a plane of a ground conductor for the mm-wave antenna elements. One or more monopole antenna elements may be disposed on a second substrate that is separate from or integrated with one or more first substrates of an array of mm-wave antenna elements, with the second substrate possibly being a flex (e.g., a flexible sheet of dielectric material). Other configurations, however, may be used.

Items and/or techniques described herein may provide one or more of the following capabilities, as well as other capabilities not mentioned. Millimeter-wave and sub-millimeter wave antenna elements may be provided in a common antenna assembly or in a common array or substrate, saving space for providing multi-band signaling in a confined volume, e.g., of a user equipment. Power loss may be limited, e.g., by providing one or more power amplifiers for mm-wave and sub-mm-wave antenna elements in close proximity to the antenna elements. Frequency diversity may be provided, e.g., to 5G mm-wave antenna assemblies. Power management capabilities may be shared, e.g., between mm-wave and sub-mm-wave systems (e.g., front-end circuits). Amplifiers may be provided on-assembly to supply signals to connection points to provide the signals to off-assembly antennas. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect or be included in all embodiments.

Figure 1:
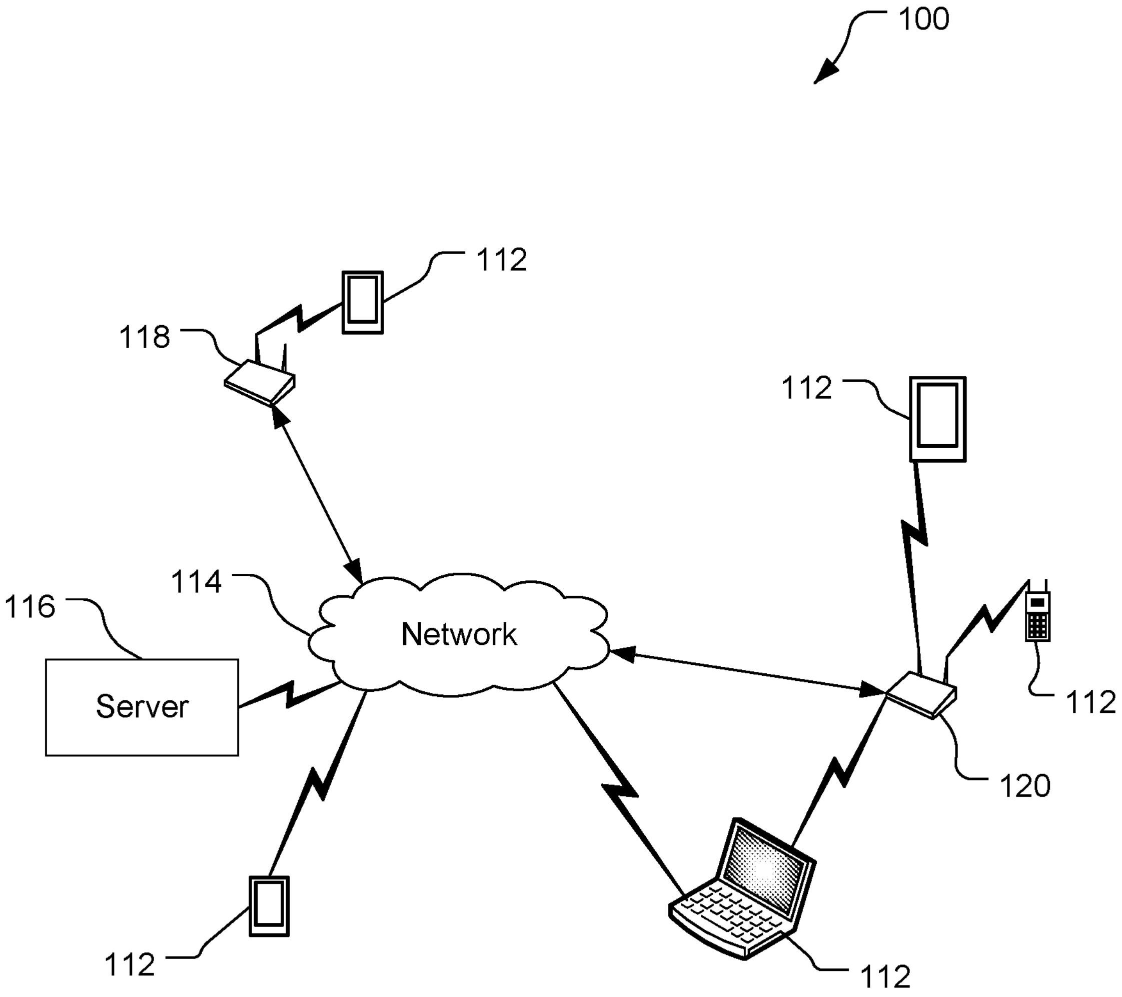
FIG. 1 is a schematic diagram of a communication system.

Referring to FIG. 1, a communication system 100 includes mobile devices 112, a network 114, a server 116, and access points (APs) 118, 120. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.).

Figure 2:
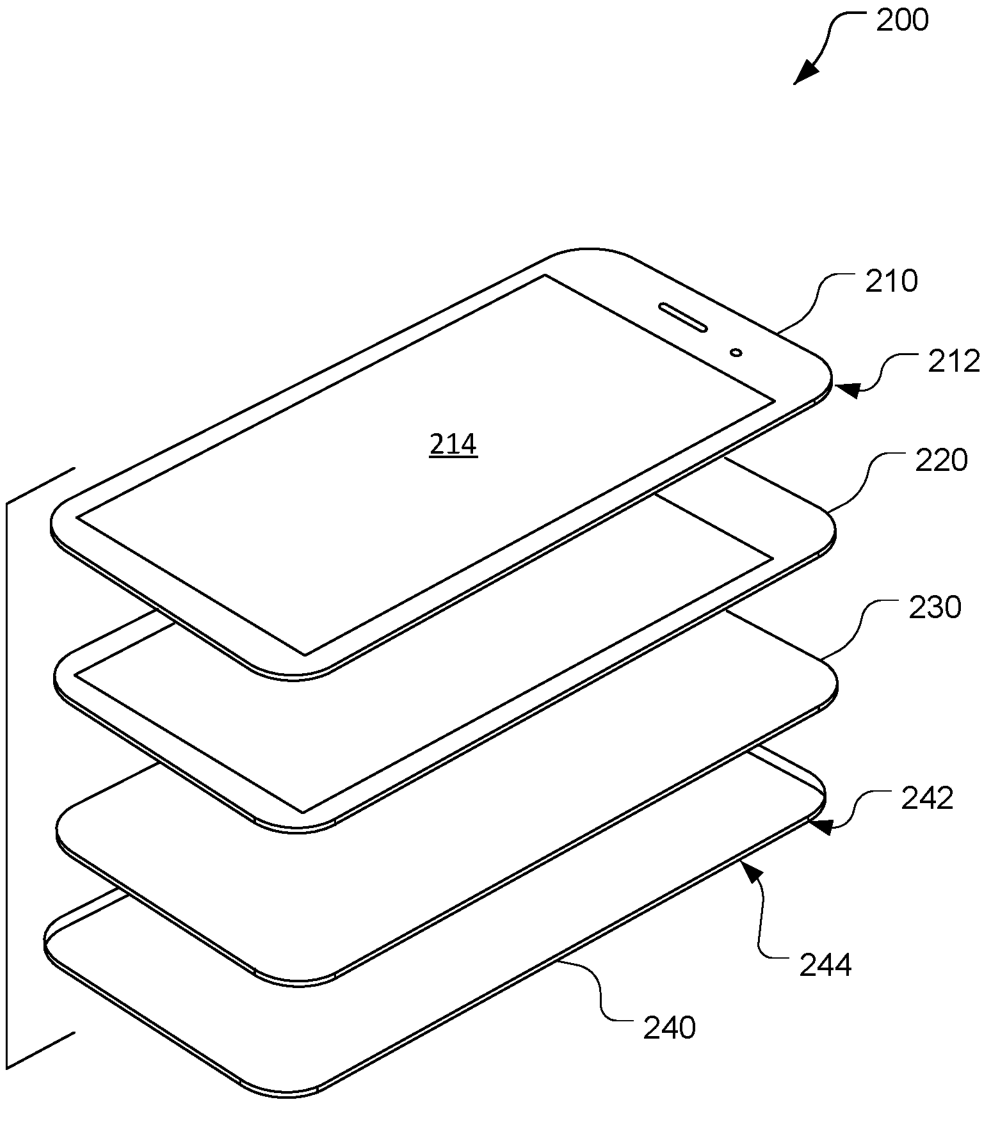
FIG. 2 is an exploded perspective view of simplified components of a mobile device shown in FIG. 1.

Referring to FIG. 2, a mobile device 200, which is an example of one of the mobile devices 112 shown in FIG. 1, includes a top cover 210, a display layer 220, a printed circuit board (PCB) layer 230, and a bottom cover 240. The mobile device 200 as shown may be a smartphone or a tablet computer but embodiments described herein are not limited to such devices (for example, in other implementations of concepts described herein, a device may be a router or customer premises equipment (CPE)). The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the mobile device 200 that may or may not be on the PCB layer 230. For example, the housing may retain (e.g., hold, contain) or be integrated with antenna systems, front-end circuits, an intermediate-frequency circuit, and a processor discussed below. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 230 may not be commensurate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing process, e.g., to reinforce a functional separation or to better utilize a space in the housing. Embodiments of the PCB layer 230 other than those illustrated may be implemented.

The limited space available in a UE (e.g., a smartphone, tablet computer, etc.) presents antenna design challenges. For example, with 10 or more antennas for LTE and sub-6 GHz bands in a mobile phone, there may be no additional space available for another antenna. Because antenna frequency bandwidth varies with antenna size, with small antennas typically having narrow bandwidths, designing a stand-alone antenna to cover a wide frequency bandwidth is challenging. Further, mechanical stability of a UE (e.g., a mobile phone) may be challenging, e.g., because non-conductive (e.g., plastic) breaks in a metal frame of the UE may be needed to separate antennas, but may weaken stability of the frame and may result in thermal issues due to an inability to dissipate heat.

As used herein, the term "user equipment" and "UE" are not specific to or otherwise limited to any particular Radio Access Technology (RAT), unless otherwise noted. In general, UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on, and UEs may communicate directly in some scenarios or systems.

Figure 3:
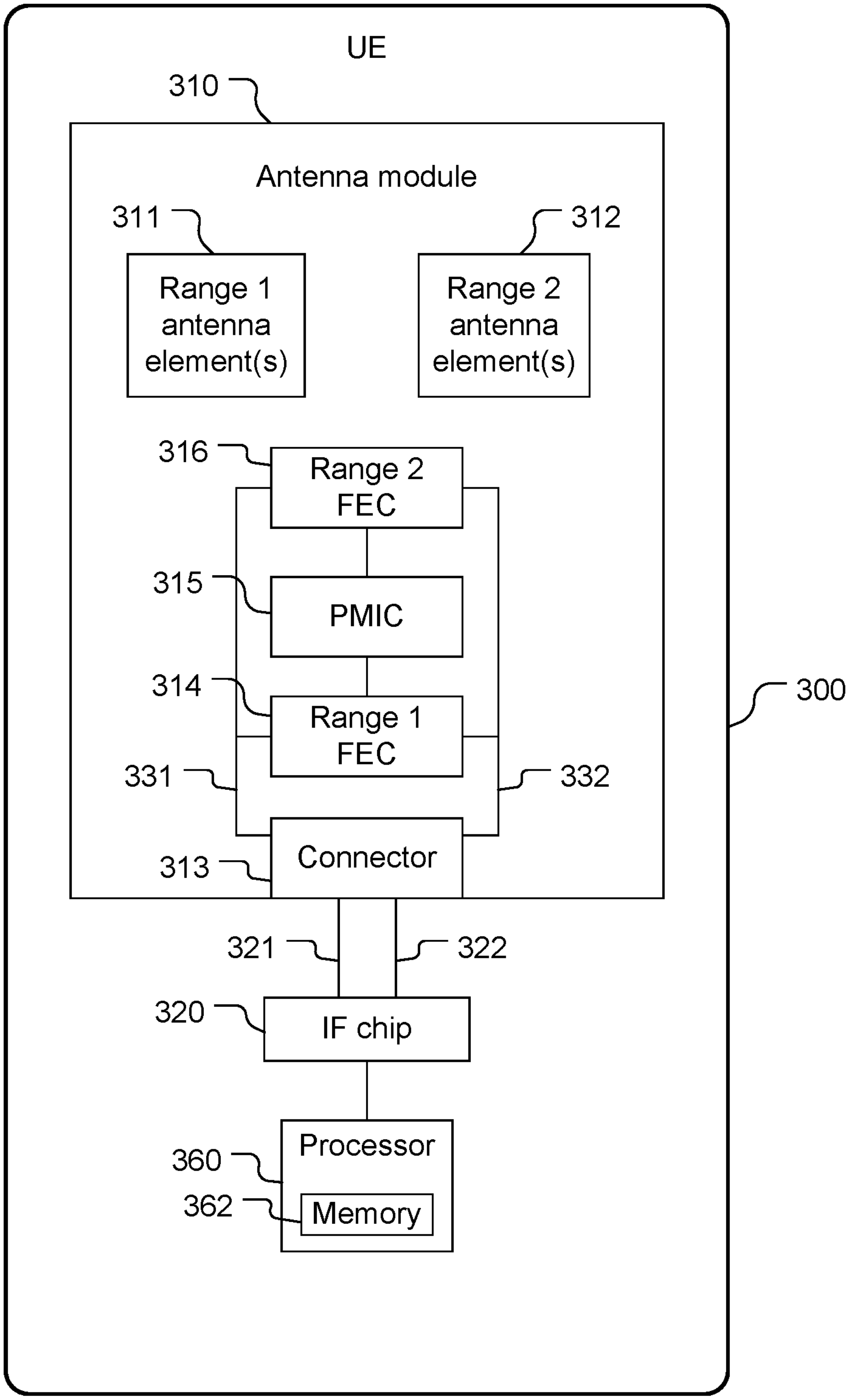
FIG. 3 is a plan view of a user equipment including an antenna assembly.

Referring also to FIG. 3, a UE 300 includes an antenna assembly 310, an intermediate frequency (IF) circuit (e.g., chip) 320, and a processor 360. The UE 300 may be an example of the mobile device 200. The UE 300 is an example, and other types of apparatus may be used and/or other quantities of antenna assemblies may be provided in the UE 300. For example, a UE may include two or more of the antenna assemblies 310, e.g., disposed along different edges of the UE. The IF chip 320 may be configured to receive baseband signals, e.g., corresponding to different polarizations to be transmitted by the antenna assembly 310, from the processor 360, to convert the baseband signals to IF signals, and to provide the IF signals to the antenna assembly 310 via lines 321, 322. The IF signals may be upconverted by the antenna assembly 310 to RF signals as appropriate or used as is (and thus, while the term IF is used, certain of such signals are not intermediate because the respective frequency is not further converted, but rather the IF signals are at a frequency (e.g., FR3) appropriate for transmission). Alternatively, the IF chip 320 may be omitted from the UE 300 (or may be configured without frequency conversion circuitry to perform baseband-to-IF conversion for the signals referenced above or configured to bypass such circuitry) and baseband signals (or near baseband signals) provided by the processor 360 to the antenna assembly 310 and the antenna assembly 310 (e.g., a front-end circuit) may upconvert the baseband signals to appropriate frequencies. The IF chip 320 may be configured to receive IF signals (corresponding to different polarizations of signals received by the antenna assembly 310) via the lines 321, 322 from the antenna assembly 310, to convert the IF signals to baseband signals, and to provide the baseband signals to the processor 360 for processing the baseband signals (e.g., decoding, etc.). Alternatively, the IF chip 320 may be omitted (or may be configured without frequency conversion circuitry to perform IF-to-baseband conversion for the signals referenced above or configured to bypass such circuitry) and the antenna assembly 310 may provide baseband signals (or near baseband signals) to the processor 360.

The antenna assembly 310 is illustrated as a module including one or more range 1 antenna elements 311, one or more range 2 antenna elements 312, a connector 313, a range 1 FEC 314 (Front-End Circuit, also called an RF circuit (e.g., an RFIC (RF Integrated Circuit))), a PMIC 315 (Power Management IC), and a range 2 FEC 316 packaged together. The PMIC 315 may implement APT (average power tracking) and/or may be shared by the range 1 FEC 314 and the range 2 FEC 316, which may reduce cost by avoiding a second PMIC. The one or more range 1 antenna elements 311 are configured to transduce signals in a first frequency range (e.g., 24.25 GHz-52.6 GHz, also known as FR2). The one or more range 2 antenna elements 312 are configured to transduce signals in a second frequency range (e.g., 7.125 GHz-24.25 GHz, also known as FR3). The FECs 314, 316 may be configured to provide one or more signals to be radiated by the antenna element(s) 311, 312, respectively, and/or to receive and process one or more signals that are received by the antenna element(s) 311, 312, respectively, and provided to the FECs 314, 316. The connector 313 is configured to connect to the lines 321, 322 to convey signals to the IF chip 320 and/or to receive signals from the IF chip 320. The connector 313 is connected to the range 1 FEC 314 and the range 2 FEC 316 and configured to convey respective signals to the range 1 FEC 314 and the range 2 FEC 316. The range 1 FEC 314 may be configured to convert between IF signals and signals in the first frequency range. The range 2 FEC 316 may be configured to convert between IF signals and signals in the second frequency range. If the signals in the second frequency range are at an intermediate frequency (e.g., in an intermediate frequency range), then the range 2 FEC may not change a frequency of the signals in the second frequency range (e.g., not change received signals from the range 2 antenna element(s) 312 and/or not change signals from the connector 313 to be transmitted by the range 2 antenna element(s) 312).

Figure 12:
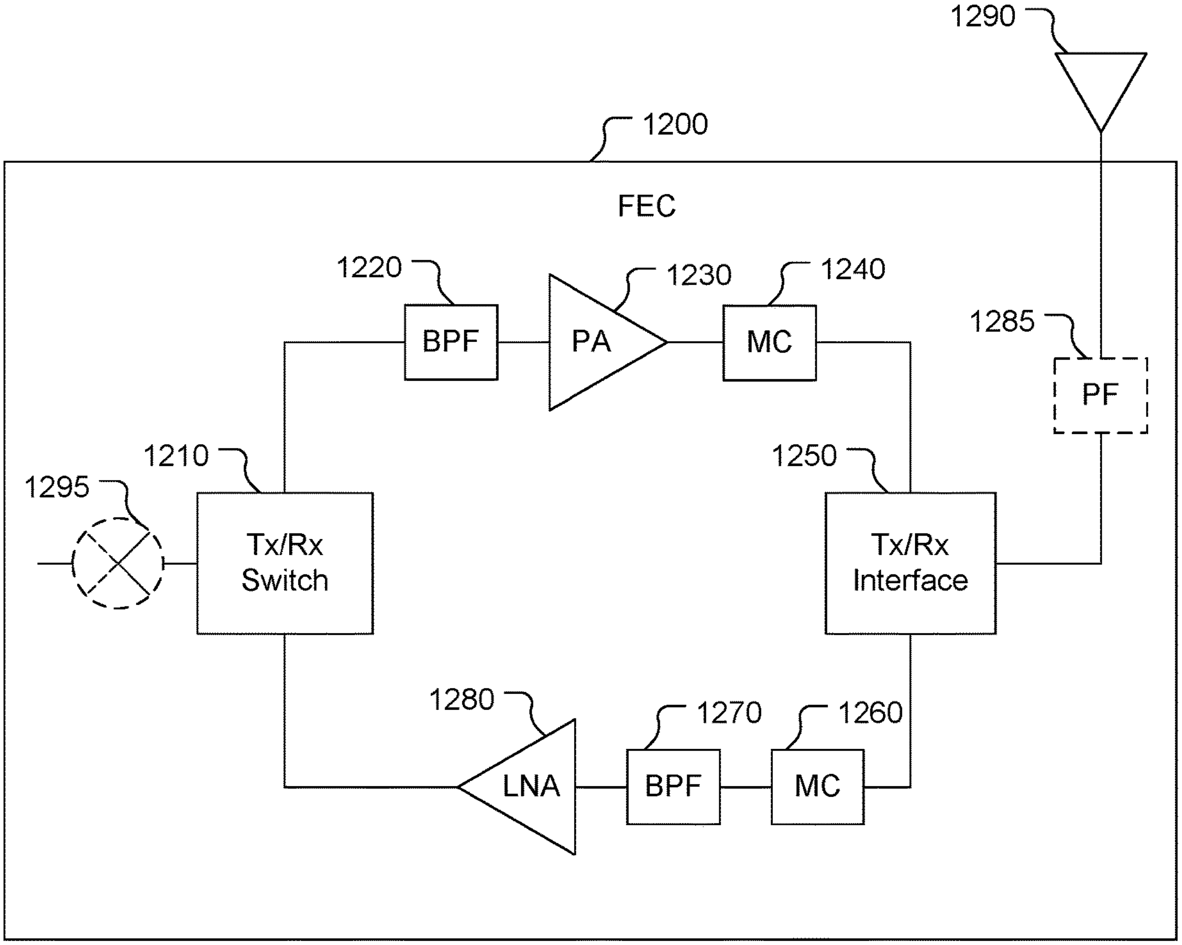
FIG. 12 is a block diagram of another example of a front-end circuit, shown in FIG. 3, and an antenna.

Referring also to FIG. 12, an FEC 1200 (which may be an example of the range 1 FEC 314 or the range 2 FEC 316) is communicatively coupled to an antenna 1290 and includes a Tx/Rx (transmit/receive) switch 1210, a BPF (bandpass filter) 1220, a PA (power amplifier) 1230, a matching circuit (MC) 1240, a Tx/Rx interface 1250, a matching circuit 1260, a BPF 1270, and an LNA (low-noise amplifier) 1280. The BPFs 1220, 1270 may be configured to pass respective frequency bands (which may be the same frequency band) of signals. Other types of filters may alternatively or additionally be implemented. The PA 1230 and the LNA 1280 are configured to amplify signals for transmission and received signals, respectively. The matching circuits 1240, 1260 are configured to provide impedance matching between transmission circuitry (e.g., the BPF 1220 and the PA 1230) the antenna 1290 and between the antenna 1290 and reception circuitry (e.g., the BPF 1270 and the LNA 1280), respectively. The FEC 1200 may include a phase shifter (PF) 1285 configured to provide different phases corresponding to different antenna elements of the antenna 1290 to provide beam steering. In some examples, the switch 1210 is omitted, for example when separate lines to RX and TX circuitry are implemented, or another type of TX/RX interface may be used. In some examples, the interface 1250 includes a switch. In other examples, and electromagnetic (EM) device is included in the interface 1250. Other types of interface may alternatively or additionally be implemented. The FEC 1200 may also include a mixer 1295 configured to perform frequency conversion between baseband and IF, or RF and baseband, as described above.

Various configurations of the range 1 antenna element(s) 311 and the range 2 antenna element(s) 312 may be used. For example, the range 2 antenna element(s) 312 may comprise one or more quarter-wavelength transducers each disposed on a substrate that overlaps with an active component set (e.g., including the range 1 FEC 314 and/or the range 2 FEC 316) and/or a substrate of at least one of the range 1 antenna element(s) 311. For example, one or more of the range 2 antenna element(s) 312 may be monopole(s) (e.g., inverted-F antenna(s), folded monopole(s)), shorted-loop(s), etc. As another example, one or more of the range 2 antenna element(s) 312 may be a patch (e.g., especially if one or more of the range 2 antenna element(s) 312 is disposed off assembly, e.g., connected to a pad disposed on the assembly 310). The discussion herein focuses on inverted-F antennas, but the range 2 antenna element(s) 312 may take one or more other forms in addition to or instead of one or more inverted-F antennas. Examples of the range 1 antenna element(s) 311 include, but are not limited to, patches (patch transducers), dipoles, and dielectric resonator antennas (DRAs), although the discussion herein focuses on patches. The range 1 antenna element(s) 311 may use a common substrate for all of the range 1 antenna element(s) 311. The range 1 antenna elements 311 and the range 1 FEC 314 may be configured as a phased array. The substrate for each of the range 2 antenna element(s) 312 may be the same substrate used by a respective range 1 antenna element. The substrate for each of the range 2 antenna element(s) may overlap the active component set, e.g., by overlapping a PCB containing the active component set such that a projection of layers of the PCB normal to the layers would intersect with at least a portion of the substrate for each of the monopole(s), e.g., as with examples discussed with respect to FIGS. 6 and 7.

The IF chip 320 is communicatively coupled to the processor 360 that includes a memory 362. The memory 362 may be a non-transitory, processor-readable storage medium that includes software with processor-readable instructions that are configured to cause the processor 360 to perform functions (e.g., possibly after compiling the instructions). The processor 360 may be implemented as a modem or a portion thereof. The processor 360 is communicatively coupled to the antenna assembly 310, which includes antenna elements. The processor 360 may be configured to provide signals to be transmitted by the antenna elements and/or may process signals received by the antenna elements. The processor 360 may be configured to control operation of one or more components of the antenna assembly 310, e.g., one or more components of the range 1 FEC 314 and/or one or more components of the range 2 FEC 316, e.g., depending on whether a respective FEC is in a transmit mode or a receive mode (e.g., as discussed with respect to FIG. 10).

Figure 4:
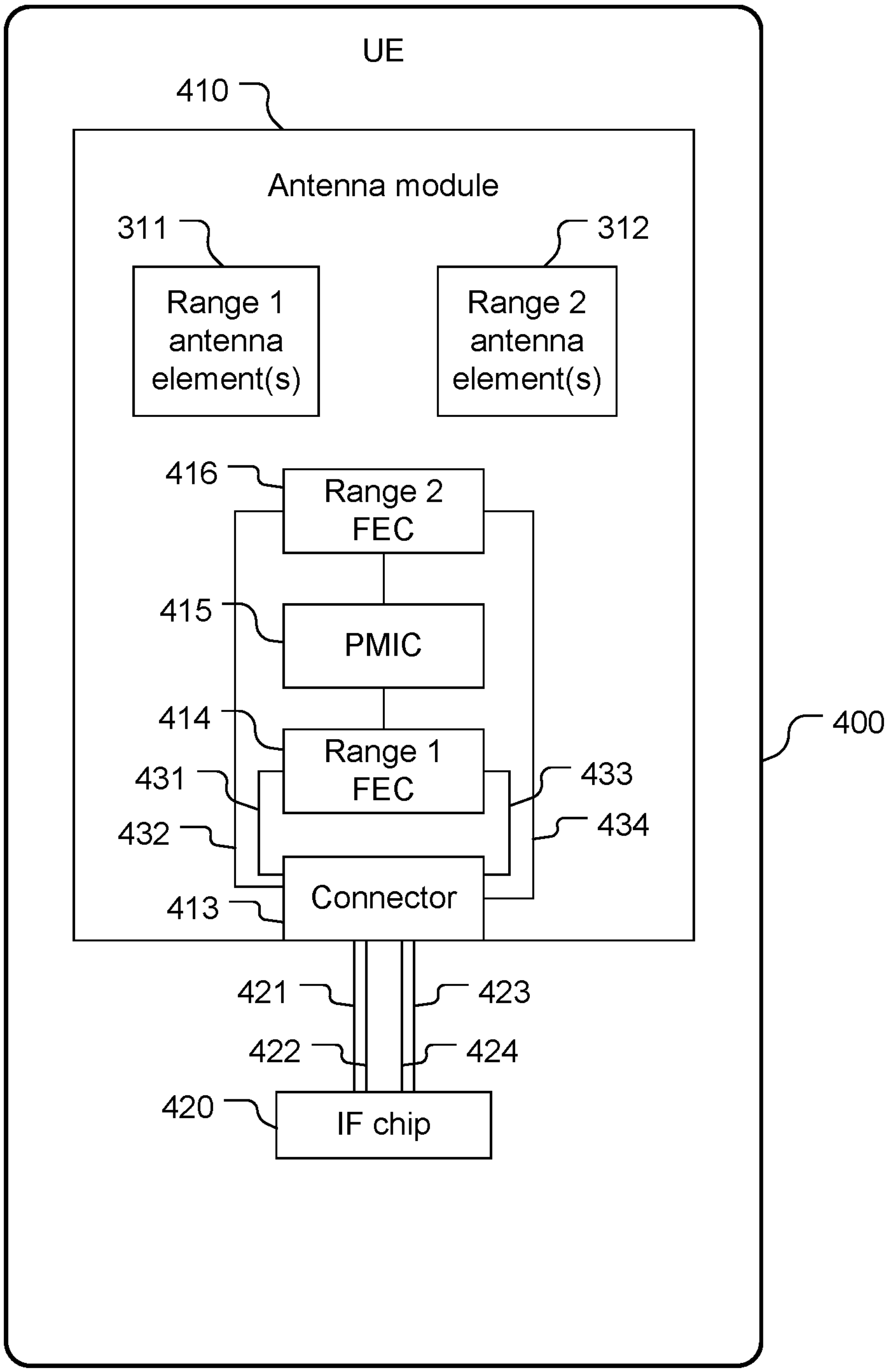
FIG. 4 is a plan view of another user equipment including an antenna assembly.

Signals conveyed between an antenna assembly connector and respective FECs and between the antenna assembly connector and an IF chip may or may not share a line. For example, if the signals for/from the range 1 FEC 314 and the signals for/from the range 2 FEC 316 have significantly different frequencies (e.g., that can be effectively separated/selected, e.g., using different filters (e.g., a low-pass filter and a high-pass filter)), then the signals may be multiplexed (MUXed) and may share a line, e.g., a signal line 331 for one polarization (e.g., horizontal (H) polarization) and a signal line 332 for another polarization (e.g., vertical (V) polarization). The signal lines 331, 332 may be connected to the lines 321, 322, respectively. One or more control lines may be provided between the range 1 FEC 314 and the range 2 FEC 316 to synchronize gain and/or timing between the FECs 314, 316. Referring to FIG. 4, another example UE 400 includes an antenna assembly 410 and an IF chip 420, with the antenna assembly illustrated as including the one or more range 1 antenna elements 311, the one or more range 2 antenna elements, a connector 413, a range 1 FEC 414, a PMIC 415, and a range 2 FEC 416 packaged together in a module. The connector 413 in this example is connected to the range 1 FEC 414 and the range 2 FEC 416 with separate lines 431, 432 to convey signals of one polarization, and to the range 1 FEC 414 and the range 2 FEC 416 with separate lines 433, 434 to convey signals of another polarization. In this way, the lines 431, 432 and the lines 433, 434 may convey signals for/from the range 1 FEC 414 and signals for/from the range 2 FEC 416 that do not have significantly different frequencies (e.g., that cannot be effectively separated/selected). Similarly, the connector 413 may be connected to the IF chip 420 with lines 421, 422, 423, 424, each for a respective polarization and FEC combination. In other examples, signals for/from the range 1 FEC 414 are coupled between an IF circuit (e.g., the IF chip 420) and the antenna assembly 410 via a subset of the lines 421-424, and signals for/from the range 2 FEC 416 are coupled between another IF circuit (not shown) and the antenna assembly 410 via a different subset of the lines 421-424. While certain concepts and configurations can be included in an antenna module (e.g., as illustrated with respect to FIGS. 3 and 4), the packaging of antennas in a module is not required.

Figure 5A:
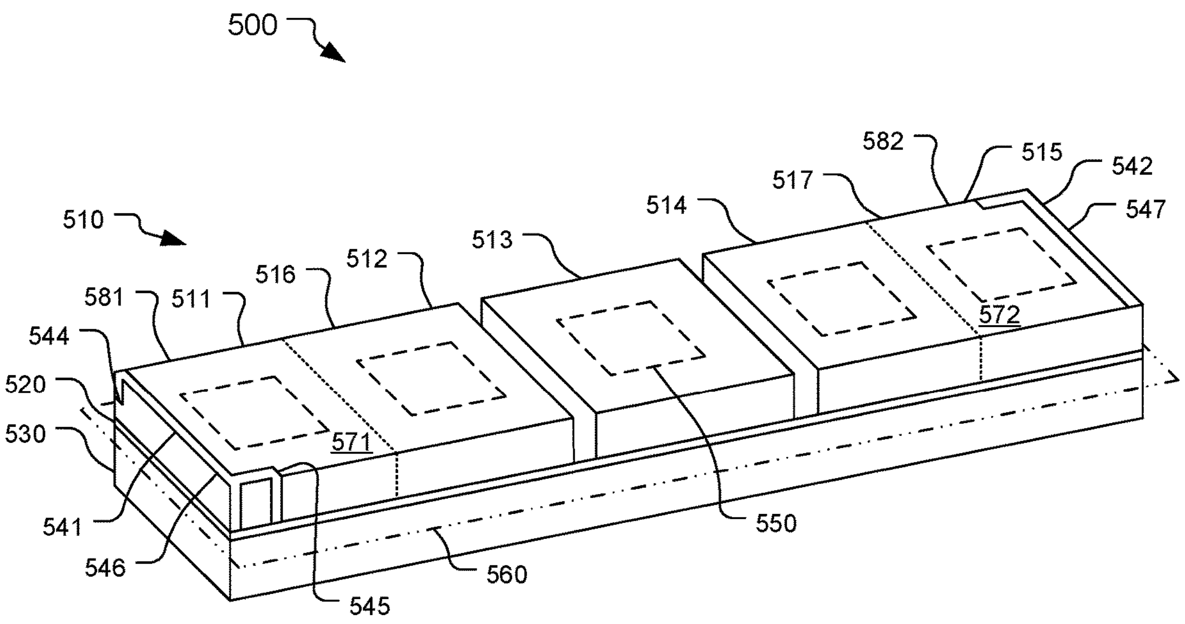
FIG. 5A is a perspective view of an example antenna assembly including an array of first frequency range antenna elements and two second frequency range inverted-F antennas.

Referring to FIG. 5A, with further reference to FIGS. 1-4, an antenna assembly 500 includes an array 510 of range 1 antenna elements 511, 512, 513, 514, 515, a ground conductor 520, an active component set 530, and one or more range 2 antenna elements including one or more respective transducers, here monopoles 541, 542. In some examples, all of these elements may be packaged together in a module. The array 510 in this example is a linear array and includes five antenna elements, but other quantities of range 1 antenna elements may be used. The range 1 antenna elements 511, 512 share a substrate 516 and the range 1 antenna elements 514, 515 share a substrate 517. This is an example, and other configurations may be used, e.g., with more than two range 1 antenna elements sharing a substrate, with all range 1 antenna elements having separate substrates or sharing the same substrate, with one or more sets of range 1 antenna elements each sharing a substrate such that an array of range 1 antenna elements is asymmetrical (with the set(s) of range 1 antenna elements sharing a respective substrate not being symmetrically disposed in the array, e.g., as shown in FIG. 9). The range 1 antenna elements 511-515 may include any of a variety of radiators (also called transducers). In this example, the range 1 antenna elements 511-515 each include a respective dual-polarized patch radiator 550. While called radiators, due to reciprocity of antennas, the radiators may receive wireless signals (and transduce the wireless signals into guided signals, e.g., wired signals) in addition to or instead of transmitting wireless signals (transducing from guided signals). The ground conductor 520 may be substantially planar, e.g., with the ground conductor 520 being a layer of a PCB, and/or with a plane 560 passing through much (e.g., a majority) of the ground conductor 520. The ground conductor 520 may be a monolithic conductor, or one or more of the antenna elements 511-515 may have a respective ground conductor that is separate from the ground conductor(s) of the other antenna elements. The active component set 530 may be disposed on an opposite side of the ground conductor 520 from the array 510. The active component set 530 includes components (e.g., power amplifiers) for providing signals to the array 510 and/or the monopoles 541, 542 and/or for processing signals from the array 510 and/or the monopole 541, 542. The array 510 may be implemented in a PCB and the active component set 530 may be implemented in a PCB which may be the same PCB in which the array 510 is implemented or may be a separate PCB from the PBC in which the array 510 is implemented. For example, the substrate(s) in which the antenna elements are implemented may be coupled to one side of a PCB (which may include routing and optionally filter elements), and an IC including the active component set 530 may be coupled to an opposite side of that PCB. In another example, the antenna elements are all included in a single substrate which also includes routing and optionally filter elements, and an IC including the active component set 530 is coupled to that substrate, e.g., such that the routing conveys signals between the antenna elements and the component set 530. Separate PCBs may be attached to each other directly, e.g., with Ball Grid Array (BGA) pads, or indirectly (e.g., through a substrate as discussed with respect to any of FIGS. 6-8).

The monopoles 541, 542 may be configured to transmit and/or receive wireless signals in the second frequency range. The use of the two monopoles 541, 542 is an example, and a different quantity of monopoles, or a single monopole, may be used. In this example, the monopoles 541, 542 are both inverted-F antennas (which are a form of monopoles), but one or more other antenna configurations (e.g., one or more other monopole configurations) may be used. A length of each of the monopoles 541, 542 from a first end 544 to a second end 545 is about a quarter of a wavelength of a desired frequency of transmission/reception. In this example, the monopoles 541, 542 are disposed along surfaces 571, 572 of, and wrap over a side of and an end of, substrates 581, 582 of the antenna elements 511, 515, respectively. Thus, the monopoles 541, 542 and the antenna elements 511, 515 use the same substrates, here the substrates 581, 582, respectively. If the antenna elements 511, 515 were wider, the monopoles 541, 542 could be disposed on a single surface of the antenna elements 511, 515, without wrapping onto one or more sides of the antenna elements 511, 515. Portions of the monopoles 541, 542 disposed along sides of the antenna elements 511, 512 may be implemented using conductive vias through the substrates 581, 582. In this example, the monopoles 541, 542 are disposed at opposite ends of the (linear) array 510, but one or more of the monopoles 541, 542 may be disposed away from a respective end of the array 510. Disposing the monopoles 541, 542 at opposite ends of the array 510 may help the antenna patterns (and thus reception/transmission) of the monopoles 541, 542. The monopoles 541, 542 may be, as in this example, laterally displaced from respective transducers, e.g., respective patch radiators, of the antenna elements 511, 515. The monopoles 541, 542 may be displaced as far as possible from respective transducers of the antenna elements 511, 515 while also having radiative arms 546, 547 of the monopoles 541, 542, respectively, be displaced as far as possible from the ground conductor 520. This may help with reception/transmission provided by the monopoles 541, 542 and reduce interference between the array 510 and the monopoles 541, 542.

Figure 5B:
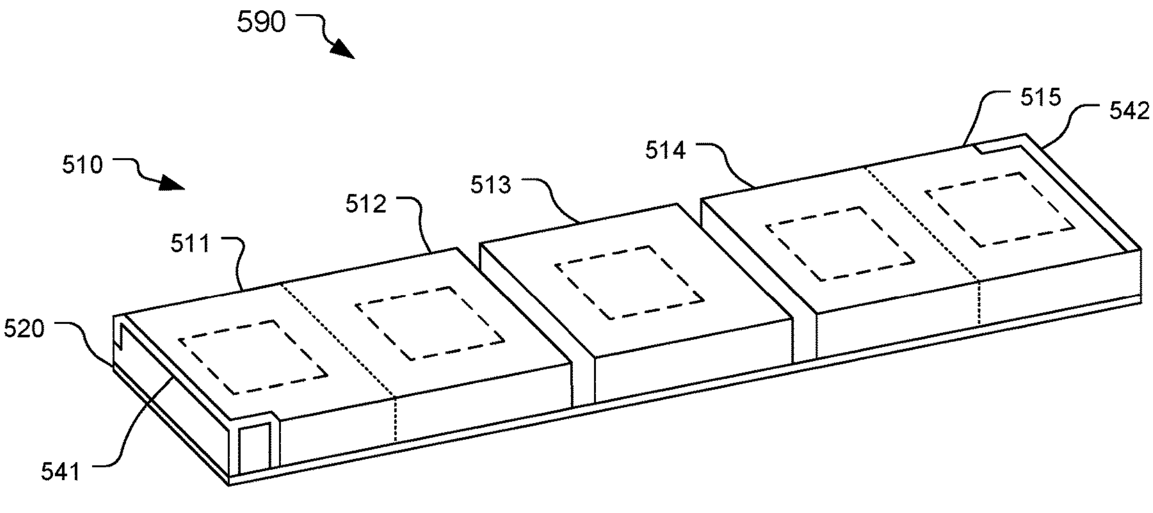
FIG. 5B is a perspective view of antenna elements shown in FIG. 5A without an active component set shown in FIG. 5A.

The active component set 530 of the antenna assembly 500 is optional. For example, referring also to FIG. 5B, an antenna assembly 590 includes the array 510 of range 1 antenna elements 511, 512, 513, 514, 515, the ground conductor 520, and the monopoles 541, 542, but lacks the active component set 530 of the antenna assembly 500. For example, the antenna assembly 590 may be provided separately from an active component set (e.g., of one or more FECs, e.g., in an RFIC). The antenna assembly 590 may be coupled to an active component set for the antenna assembly 500 or another antenna assembly, or to an active component set that is implemented remote from any antenna. For example, the active component set may be attached to a main board of a device and coupled via signal lines or other conductors to one or more separate antennas/arrays. Other antenna assemblies discussed herein may include (or otherwise be physically attached to) respective active component sets or may be separate from, and configured to couple to, respective active components sets.

Figure 6:
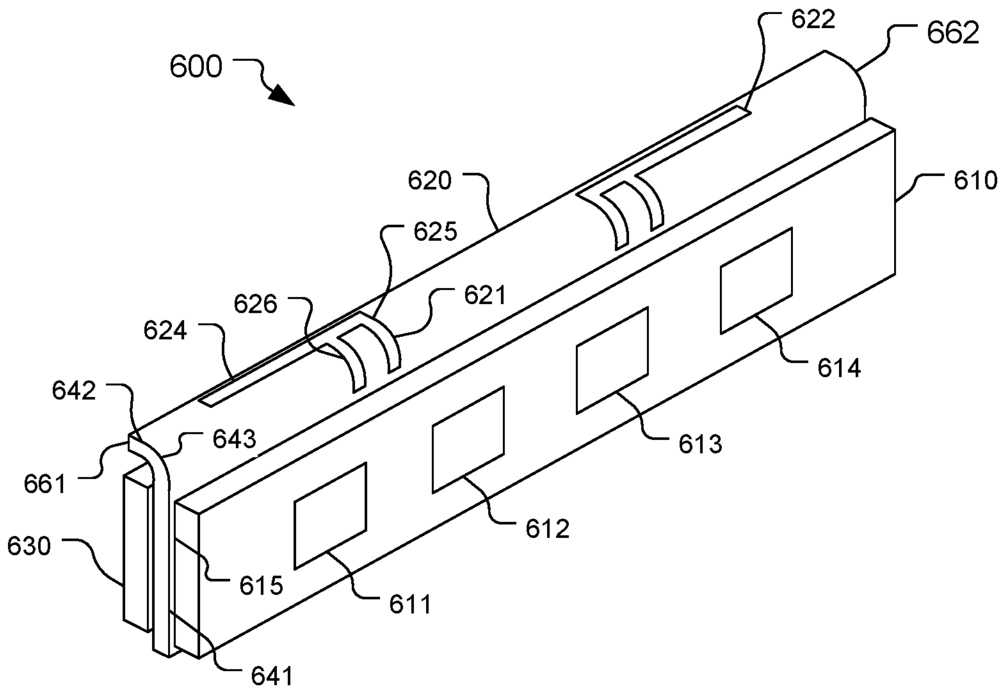
FIG. 6 is a perspective view of another example antenna assembly including an array of first frequency range antenna elements and two second frequency range inverted-F antennas.

Referring also to FIG. 6, another example antenna assembly 600 includes an array 610 of range 1 antenna elements 611, 612, 613, 614, an active component set 630, and a substrate 620 on which are disposed monopoles 621, 622. The array 610 is configured to transmit and/or receive range 1 wireless signals in a first frequency range (e.g., FR2) and may include a ground conductor 615. The active component set 630 may comprise a PCB and/or IC (and/or other components) connected to the substrate 620, e.g., by a BGA. The substrate 620 may be, as shown, at least partially disposed between the array 610 and the active component set 630, at least partially overlapping with the antenna elements 611-614 (here, including patch radiators). The substrate 620 may be a flexible ("flex") substrate, e.g., a flexible sheet of dielectric material. Use of a flex may help the antenna assembly 600 fit into a UE, e.g., a small available space in a smartphone or tablet computer. The substrate 620 may, as in this example, be disposed in an "L" shape, having a relatively longer first section 641 and a relatively shorter second section 642 extending approximately perpendicular to the first section 641, here with a curved transition section 643 connecting the first section 641 to the second section 642. The substrate 620 may comprise a single layer or may comprise two or more layers (e.g., a three-layer flex including two ground layers and a signal layer). In other examples, the substrate(s) of the range 1 antenna elements 611, 612, 613, 614 is not separate from the substrate 620, but rather is integrated therewith. For example, the substrate 620 may be formed by one or more layers of the range 1 antenna elements substrate(s) that extend substantially beyond a perimeter of the antenna elements 611, 612, 613, 614.

The monopoles 621, 622 are configured to transmit and/or receive range 2 wireless signals in a second frequency range (e.g., FR3). The monopoles 621, 622 in this example are inverted-F antennas. For example, the monopole 621 includes a radiative section 624, a ground section 625 coupling the radiative section 624 to a ground conductor, and an energy coupler section 626 coupled to transmit and/or receive circuitry configured to supply signals for transmission by the radiative section 624 and/or receive and process signals received by the radiative section 624. In this example, radiative sections of the monopoles 621, 622 extend along a length of the antenna assembly 600, parallel to a length of the (linear) array 610. Also in this example, the monopoles 621, 622 do not share a substrate with the array 610, e.g., any of the antenna elements 611-614. The substrate 620 is disposed on an opposite side of the ground conductor 615 from the antenna elements 611-614 and the second section 642 and the transition section 643 extend away from the array 610. Consequently, the monopoles 621, 622 are disposed on an opposite side of the ground conductor 615 from the antenna elements 611-614 and the second section 642 and the transition section 643 extend away from the array 610, e.g., from the ground conductor 615 and from the antenna elements 611-614. Disposing the monopoles 621, 622 on an opposite side of the ground conductor 615 from the antenna elements 611-614 may help inhibit interference between the antenna elements 611-614 and the monopoles 621, 622, and/or may reduce an effect of the array 610 on the antenna patterns of the monopoles 621, 622. The monopoles 621, 622 may, as shown, be disposed away from ends 661, 662 of the substrate 620, e.g., while maintaining acceptable antenna patterns. In one or more other configurations, the monopoles 621, 622 may be disposed closer to the edges 661, 662 than as shown. The monopoles 621, 622 may not be arrayed, e.g., having independent associated feeds and/or reception circuitry.

Figure 7:
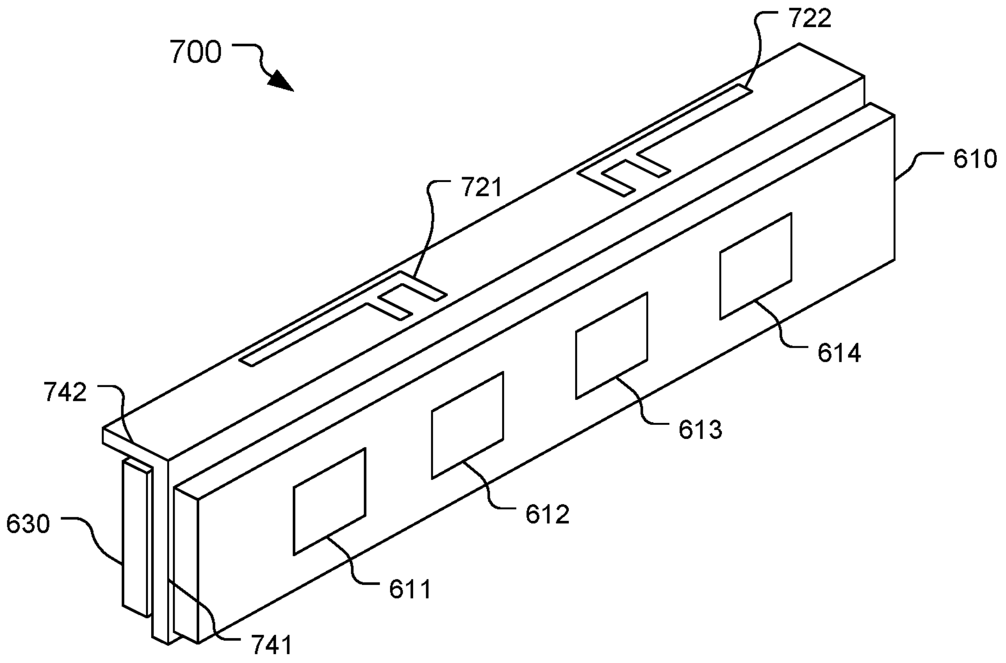
FIG. 7 is a perspective view of another example antenna assembly including an array of first frequency range antenna elements and two second frequency range inverted-F antennas.

Referring also to FIG. 7, substrate configurations, other than that shown in FIG. 6, for carrying monopoles may be used. For example, an antenna assembly 700 includes the array 610, the active component set 630, and a substrate 720 on which are disposed monopoles 721, 722. In this example, the substrate 720 is L-shaped, having a first section 741 and a second section 742 extending substantially perpendicular to the first section. Having a right-angle L-shaped substrate may help save volume for the antenna assembly 700 and/or may help the antenna assembly 700 fit within a larger apparatus, e.g., a UE. The substrate 720 may be, as shown, partially disposed between the array 610 and the active component set 630, at least partially overlapping with the antenna elements 611-614. The substrate 720 may be a flex or may be a rigid substrate.

Figure 8:
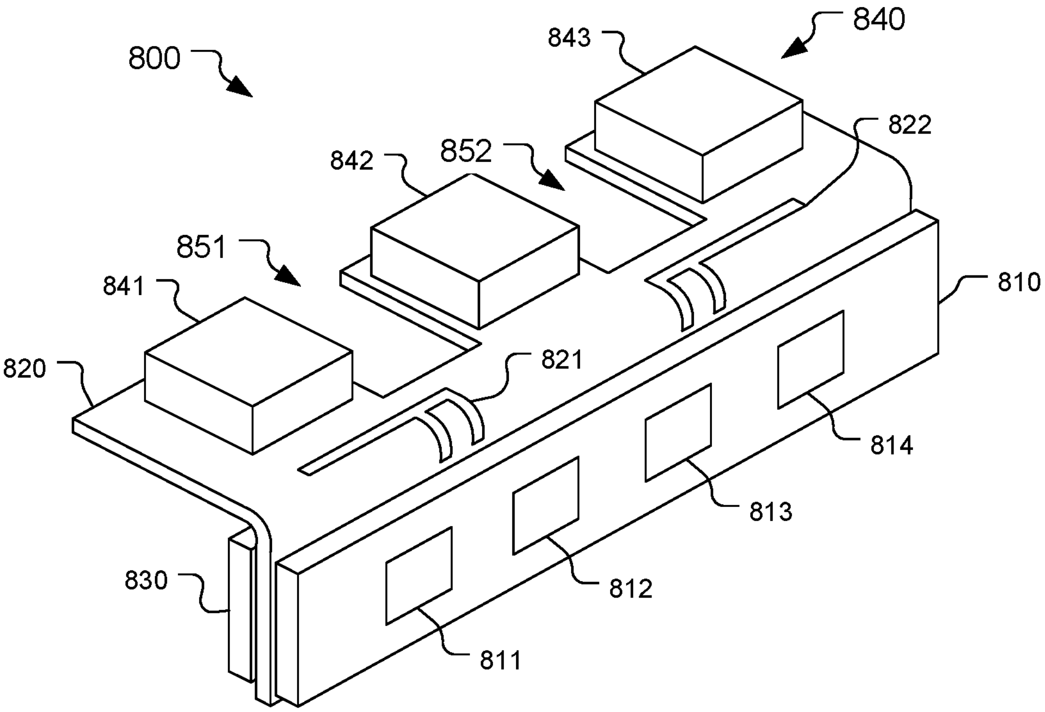
FIG. 8 is a perspective view of another example antenna assembly including a first array of first frequency range antenna elements, two second frequency range inverted-F antennas, and a second array of first frequency range antenna elements.
Figure 9:
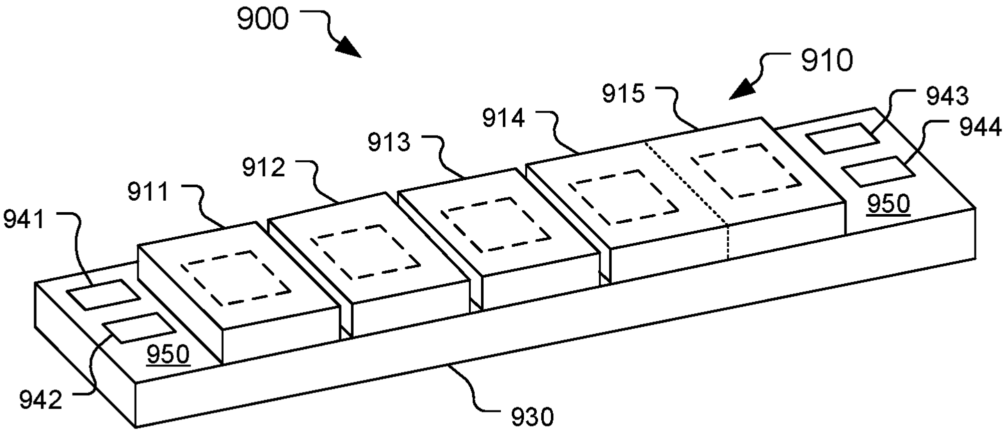
FIG. 9 is a perspective view of another example antenna assembly including an array of first frequency range antenna elements and pads for connecting to second frequency range antenna elements.

Referring also to FIG. 8, another example antenna assembly 800 includes a first array 810 of range 1 antenna elements 811, 812, 813, 814 (e.g., including patch radiators), a substrate 820 on which monopoles 821, 822 are disposed, an active component set 830, and a second array 840 of range 1 antenna elements 841, 842, 843 (e.g., including patch radiators). In other examples, the antenna elements 841, 842, 843 may instead be configured as range 2 antenna elements (and the monopoles 821, 822 may be omitted, if desired or required for performance). Each of the antenna elements 841-843 may be dual polarized, and the array 840 may be a phased array (as with other arrays discussed herein such as the array 510, the array 610, and/or the array 810). The monopoles 821, 822 may be configured to transmit and/or receive range 2 wireless signals. The substrate 820 may have a gap between each pair of the antenna elements 841, 842, 843, e.g., gaps 851, 852 as shown, or may omit the gaps. The substrate 820 may be a flex, and the monopoles 821, 822 may be disposed, as shown, between the antenna elements 811-814 and the antenna elements 841-843 (i.e., between the arrays 810, 840). A different number of antenna elements may be included in the array 840 than illustrated.

Referring also to FIG. 9, an antenna assembly 900 may be configured with a range 1 array 910 of antenna elements and connectors that are configured to receive range 2 antenna elements. In this example, the antenna assembly 900 includes an array 910 of range 1 antenna elements 911, 912, 913, 914, 915, an active component set 930, and conductive pads 941, 942, 943, 944. The conductive pads 941, 942 are disposed on a surface 950 (e.g., of the active component set 930 or of a substrate to which the active component set 930 is attached), and are configured and disposed to receive a ground connection and a signal connection (which may be called a feed), respectively, of a range 2 monopole, e.g., an inverted-F antenna. Similarly, the conductive pads 943, 944 are disposed on the surface 950, and are configured and disposed to receive a ground connection and a signal connection, respectively, of another range 2 monopole. Monopoles may be connected to the conductive pads 941-944, e.g., temporarily such as by pressure or more permanently, e.g., by soldering. The conductive pads 941-944 may provide signals (e.g., FR3 signals) for access to off-assembly antennas even though amplifiers and/or other front end components for these signals are on-assembly, e.g., in the active component set 930.

Components of any of the assemblies 500, 600, 700, 800, 900 may be disposed in a respective single physical module. For example, antenna elements and a respective active component set may be physically attached to each other directly or indirectly (e.g., via an interposer). A module may include a housing or packaging containing or partially containing components of the respective assembly 500, 600, 700, 800, 900.

Figure 10:
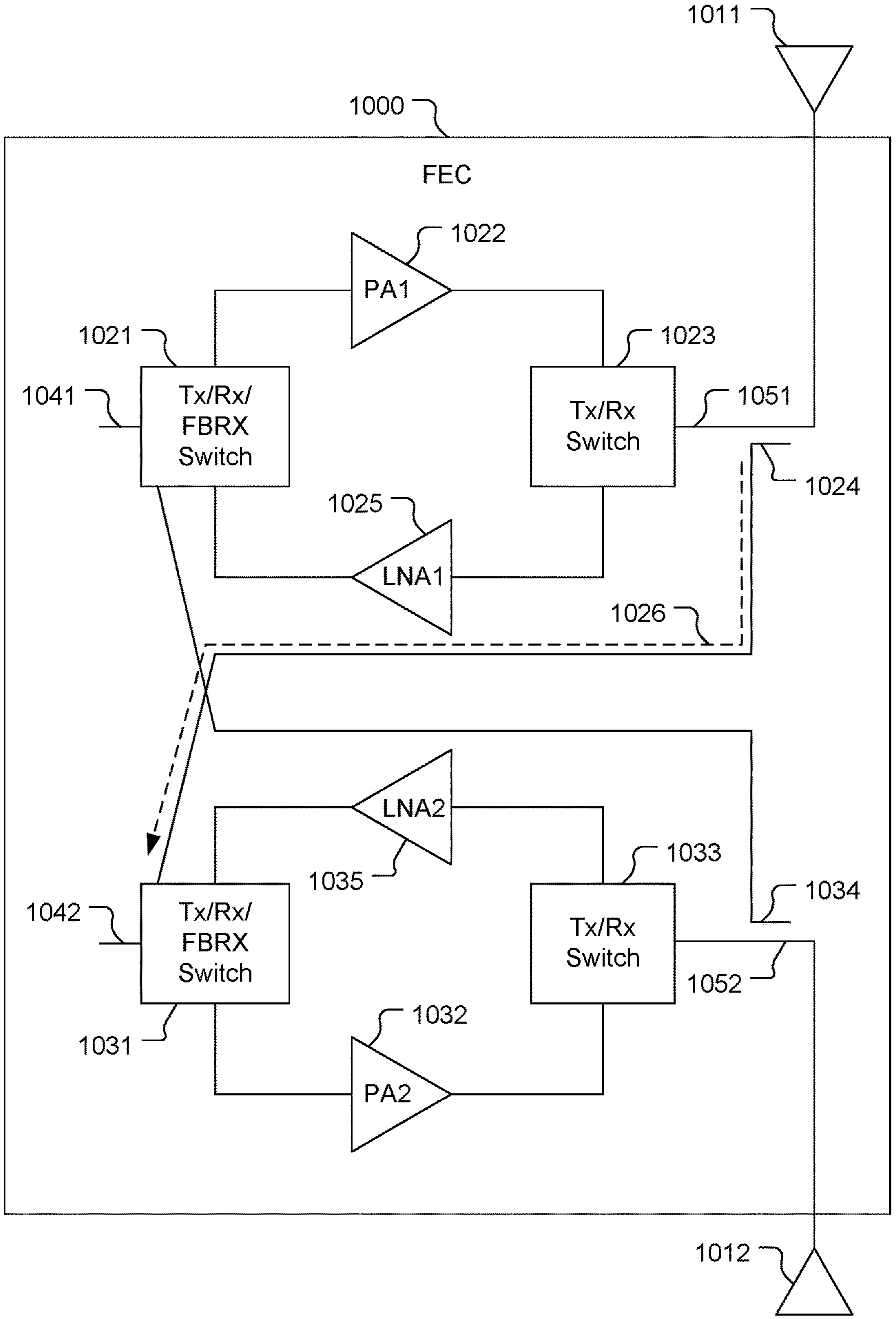
FIG. 10 is a block diagram of an example of a front-end circuit, shown in FIG. 3, and two antennas.

Referring also to FIG. 10, an FEC 1000 is an example of the range 2 FEC 316 and is communicatively coupled to antennas 1011, 1012 (also called antenna elements). The FEC 1000 includes transmit/receive components corresponding to each of the antennas 1011, 1012, including a Tx/Rx/FBRX switch 1021 (transmit/receive/feedback receive switch), a PA 1022 (power amplifier), a Tx/Rx switch 1023, a feedback coupler 1024, and an LNA 1025 (low-noise amplifier) corresponding to the antenna 1011, and a Tx/Rx/FBRX switch 1031, a PA 1032, a Tx/Rx switch 1033, a feedback coupler 1034, and an LNA 1035 corresponding to the antenna 1012. The PAs 1022, 1032 are disposed close to the respective antennas 1011, 1012, thus avoiding lengthy transmission lines between the PAs 1022, 1032 and the antennas 1011, 1012 and thus avoiding corresponding loss that would be incurred in longer transmission lines to the antennas 1011, 1012.

A processor (e.g., the processor 360) may control the switches 1021, 1023, 1031, 1033, the PAs 1022, 1032, and the LNAs 1025, 1035 to be in a receive mode or a transmit mode. In a first transmit mode, the processor 360 may control appropriate components of the FEC 1000 such that a signal is transmitted from only the antenna 1011 (e.g., with only one of the PAs 1022, 1032 being active at a time), e.g., to conserve power consumption and/or help avoid interference. For example, the processor may control the switch 1021 to connect an input/output line 1041 to the PA 1022, and control the switch 1023 to direct a signal from the PA 1022 to an output/input line 1051 and to the antenna 1011. The feedback coupler 1024 couples a portion of the transmit signal on the output/input line 1051 to the switch 1031 as a signal 1026. The processor may control the switch 1031 to direct the signal 1026 from the feedback coupler 1024 to an input/output line 1042 to an IF chip (e.g., the IF chip 320), e.g., for power control. Similarly, in a second transmit mode, the processor may control the switch 1031 to connect the input/output line 1042 to the PA 1032, and control the switch 1033 to direct a signal from the PA 1032 to an output/input line 1052 and to the antenna 1012. The feedback coupler 1034 couples a portion of the transmit signal on the output/input line 1052 to the switch 1021 as a feedback signal. The processor may control the switch 1021 to direct the feedback signal from the feedback coupler 1034 to the input/output line 1041 to the IF chip.

In a receive mode, the processor (e.g., the processor 360) may control components of the FEC 1000 to receive signals from both of the antennas 1011, 1012 and direct the received signals accordingly. For example, the processor may cause both of the LNAs 1025, 1035 to be powered ON concurrently, the switches 1023, 1033 to direct signals from the antennas 1011, 1012 to the LNAs 1025, 1035, respectively, and the switches 1021, 1031 to direct signals received from the LNAs 1025, 1035 to input/output lines 1041, 1042, respectively. Consequently, for example, if a UE includes two of the antenna assemblies 310 and each antenna assembly includes two range 2 antennas, then the processor 360 may cause the two range 2 antennas (one per assembly) to transmit respective signals concurrently in a transmit mode, and may cause four antennas to receive signals concurrently in a receive mode.

The FEC 1000 may be a portion of, and communicatively coupled to another portion of, an active component set and configured to selectively convey signals in different transmit modes and a receive mode. For example, in a first transmit mode, the FEC 1000 may couple a first input/output (e.g., the input/output line 1041) via a first power amplifier (e.g., the PA 1022) to a first output/input (e.g., the output/input line 1051). The feedback coupler 1024 and the switch 1031 may couple a first portion of a signal at the first output/input (e.g., on the output/input line 1051) to a second input/output (e.g., the input/output line 1042). In a receive mode, the FEC 1000 may couple the first output/input (e.g., the output/input line 1051) to the first input/output (e.g., the input/output line 1041) via a first LNA (e.g., the LNA 1025) and may couple a second output/input (e.g., the output/input line 1052) to the second input/output (e.g., the input/output line 1051) via a second LNA (e.g., the LNA 1035). The FEC, in a second transmit mode, may couple the second input/output (e.g., the input/output line 1051) via a second power amplifier (e.g., the PA 1032) to a second output/input (e.g., the output/input line 1052). The feedback coupler 1034 and the switch 1021 may couple a second portion of a signal at the second output/input (e.g., on the output/input line 1052) to the first input/output (e.g., the input/output line 1041).

Figure 11:
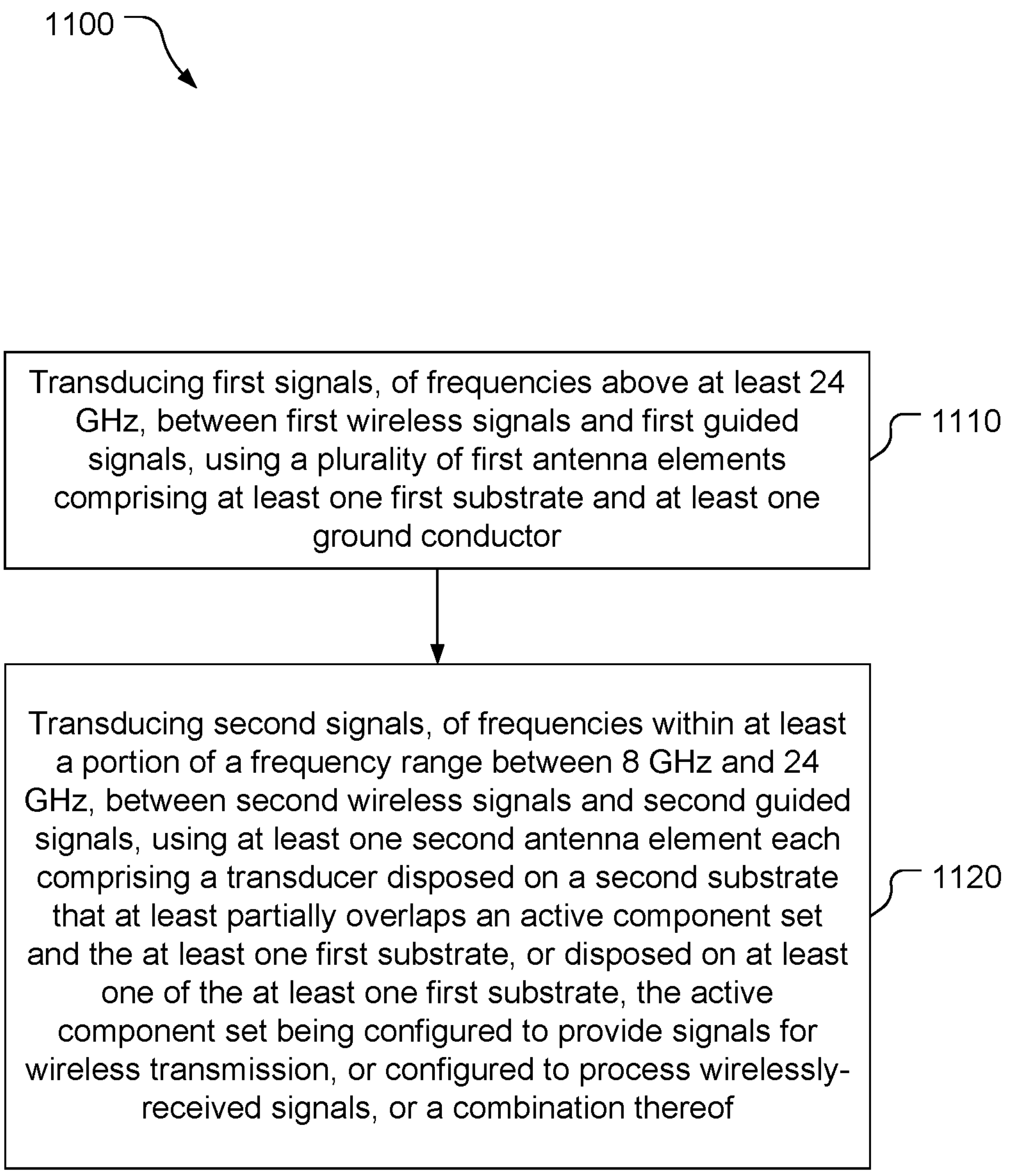
FIG. 11 is a block flow diagram of a method of transducing signals.

Referring to FIG. 11, with further reference to FIGS. 1-10, a method 1100 of transducing signals includes the stages shown. The method 1100 is, however, an example and not limiting. The method 1100 may be altered, e.g., by having one or more stages added, removed, rearranged, combined, performed concurrently, and/or having one or more single stages split into multiple stages.

At stage 1110, the method 1100 includes transducing first signals, of frequencies above at least 24 GHz, between first wireless signals and first guided signals, using a plurality of first antenna elements comprising at least one first substrate and at least one ground conductor. For example, any of the arrays 510, 610, 810, 910 may be used to transmit and/or receive wireless signals with frequencies above 24 GHz (e.g., within the FR2 band, or above 30 GHz, etc.). One or more of the first antenna elements may comprise a respective separate substrate (e.g., the antenna element 513) and/or multiple first antenna elements may share a substrate (e.g., the antenna elements 511, 512 and the antenna elements 514, 515, or the antenna elements 611-614). Each of the first antenna elements may comprise a patch transducer and a ground conductor, or may comprise another type of signal transducer (e.g., a monopole, an open-ended waveguide, a dipole, etc.). Any of the arrays 510, 610, 810, 910, or an array of transducers other than patch transducers, may comprise means for transducing the first signals.

At stage 1120, the method 1100 includes transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof. For example, one or more of the monopoles 541, 542, or one or more of the monopoles 621, 622, or one or more of the monopoles 721, 722, or one or more of the monopoles 821, 822, disposed on the substrate 620, 820 overlapping the active component set 530, 630, 830, or disposed on the substrate 516, 517 may be used to transduce signals with frequencies somewhere between 8 GHz and 24 GHz (e.g., in the FR3 range, or another range such as the 13 GHz band, or yet another range, e.g., between 20 GHz and 22 GHz, etc.). One or more of the monopoles 541, 542, or one or more of the monopoles 621, 622, or one or more of the monopoles 721, 722, or one or more of the monopoles 821, 822 may comprise means for transducing the second signals.

Implementations of the method 1100 may include one or more of the following features. In an example implementation, the second substrate is at least partially disposed between the active component set and the plurality of first antenna elements. For example, the substrate 620 is partially disposed between the active component set 630 and the antenna elements 611-614. In another example implementation, the method 1100 may include transducing third signals between third wireless signals and third guided signals using at least one third antenna element disposed on the second substrate, the at least one third antenna element being communicatively coupled to the active component set. For example, one or more of the antenna elements 841-843 may be used to transduce signals with frequencies somewhere between 8 GHz and 24 GHz, or signals with frequencies greater than 24 GHz. One or more of the antenna elements 841-843 may comprise means for transducing the third signals.

Also or alternatively, implementations of the method 1100 may include one or more of the following features. In an example implementation, the method 1100 includes, in a first transmit mode: conveying a first one the second guided signals from a first input/output of a front-end circuit (FEC), via a first power amplifier, to a first output/input of the FEC that is communicatively coupled to a first one of the at least one second antenna element; and conveying a first portion of the first one of the second guided signals at the first output/input to a second input/output of the FEC. For example, in a first transmit mode, a signal on the input/output line 1041 may be conveyed via the PA 1022 to the output/input line 1051 and to the antenna 1011. Further, the signal 1026 (comprising a portion of the signal on the output/input line 1051) may be conveyed to the input/output line 1042. The switches 1021, 1023 and the PA 1022 may comprise means for conveying the first one of the second guided signals and the feedback coupler 1024 and the switch 1031 may comprise means for conveying the first portion of the first one of the second guided signals. In a further example implementation, the method 1100 may include, in a second transmit mode: conveying a second one the second guided signals from a second input/output of the FEC, via a second power amplifier, to a second output/input of the FEC that is communicatively coupled to a second one of the at least one second antenna element; and conveying a second portion of the second one of the second guided signals at the second output/input to the first input/output of the FEC. For example, in a second transmit mode, a signal on the input/output line 1042 may be conveyed via the PA 1032 to the output/input line 1052 and to the antenna 1012. Further, the feedback signal (comprising a portion of the signal on the output/input line 1052) may be conveyed to the input/output line 1041. The switches 1031, 1033 and the PA 1032 may comprise means for conveying the second one of the second guided signals and the feedback coupler 1034 and the switch 1021 may comprise means for conveying the second portion of the second one of the second guided signals.

Implementation Examples

Implementation examples are provided in the following numbered clauses.

Clause 1. A user equipment (UE) antenna system comprising:

an active component set configured to provide signals for wireless transmission, or configured to process wirelessly-received signals, or a combination thereof;

a plurality of first antenna elements communicatively coupled to the active component set and configured to transduce first signals, of frequencies above at least 24 GHz, between first wireless signals and first guided signals, the plurality of first antenna elements comprising at least one ground conductor and at least one first substrate, each of the plurality of first antenna elements comprising a first transducer; and at least one second antenna element communicatively coupled to the active component set and configured to transduce second signals, of frequencies within at least a portion of a frequency range between 8 GHz and 24 GHz, between second wireless signals and second guided signals, each of the at least one second antenna element comprising a second transducer disposed on a second substrate that at least partially overlaps the active component set and the at least one first substrate, or disposed on at least one of the at least one first substrate.

Clause 2. The UE antenna system of clause 1, wherein the second transducer is a monopole.

Clause 3. The UE antenna system of clause 1 or 2, wherein the second transducer is an inverted-F antenna.

Clause 4. The UE antenna system of any of clauses 1-3, wherein the second transducer of each of the at least one second antenna element is disposed on at least one of the at least one first substrate and is laterally displaced from the first transducer of a respective one of the plurality of first antenna elements.

Clause 5. The UE antenna system of any of clauses 1-4, wherein the plurality of first antenna elements are disposed in a linear array and the at least one second antenna element comprises two second transducers, each disposed proximate to a respective end of the linear array.

Clause 6. The UE antenna system of any of clauses 1-3, wherein the second substrate is at least partially disposed between the active component set and the plurality of first antenna elements.

Clause 7. The UE antenna system of any of clauses 1-3, wherein the at least one ground conductor is substantially disposed in a plane, the first transducer of each of the plurality of first antenna elements is disposed on a first side of, and separated from, the plane and the at least one second antenna element is disposed on a second side of the plane, opposite the first side of the plane.

Clause 8. The UE antenna system of any of clauses 1-3, wherein the second substrate comprises a flexible sheet.

Clause 9. The UE antenna system of any of clauses 1-3, wherein the second substrate comprises an L-shaped sheet comprising a first section, a second section extending substantially perpendicularly away from the first section, and a transition section connecting the first section to the second section, the first section at least partially overlapping with the plurality of first antenna elements, the at least one second antenna element being disposed at least partially on the transition section.

Clause 10. The UE antenna system of clause 9, further comprising at least one third antenna element disposed on the second section, the at least one third antenna element being communicatively coupled to the active component set and configured to transduce third signals between third wireless signals and third guided signals.

Clause 11. The UE antenna system of any of clauses 1-3, wherein the second substrate includes a first portion at least partially overlapping with the plurality of first antenna elements and a second portion laterally displaced from the plurality of first antenna elements, and wherein the at least one second antenna element is disposed on the second portion of the second substrate.

Clause 12. The UE antenna system of any of clauses 1-11, wherein the active component set comprises at least a portion of a first printed circuit board (PCB), wherein the plurality of first antenna elements comprise at least respective portions of at least one second PCB, and wherein the first PCB is physically connected to the at least one second PCB directly, or the first PCB is physically connected directly to the second substrate and the second substrate is physically connected directly to the at least one second PCB.

Clause 13. The UE antenna system of clause 12, wherein the active component set comprises a power amplifier for the at least one second antenna element.

Clause 14. The UE antenna system of any of clauses 1-13, wherein the active component set comprises:

a first front-end circuit communicatively coupled to the plurality of first antenna elements;

a second front-end circuit communicatively coupled to the at least one second antenna element; and a single power management circuit communicatively coupled to the first front-end circuit and the second front-end circuit.

Clause 15. The UE antenna system of any of clauses 1-14, wherein at least two first antenna elements of the plurality of first antenna elements share a single substrate.

Clause 16. The UE antenna system of clause 1, wherein the active component set, the plurality of first antenna elements, and the at least one second antenna element are disposed in a single physical module.

Clause 17. The UE antenna system of any of clauses 1-16, wherein the at least one second antenna element comprises a plurality of second antenna elements and wherein the active component set comprises a front-end circuit (FEC), the FEC comprising a first input/output, a first output/input, a second input/output, and a second output/input, and configured to:

couple the first input/output, via a first power amplifier, to the first output/input that is communicatively coupled to a first one of the plurality of second antenna elements in a first transmit mode;

convey a first portion of a first one of the second guided signals at the first output/input in the first transmit mode to the second input/output; and couple, in a receive mode, the first output/input to the first input/output via a first low-noise amplifier, and the second output/input to the second input/output via a second low-noise amplifier.

Clause 18. The UE antenna system of clause 17, wherein the FEC is configured to:

couple the second input/output, via a second power amplifier, to the second output/input that is communicatively coupled to a second one of the plurality of second antenna elements in a second transmit mode; and convey a second portion of a second one of the second guided signals at the second output/input in the second transmit mode to the first input/output.

Clause 19. A method of transducing signals, the method comprising:

transducing first signals, of frequencies above at least 24 GHz, between first wireless signals and first guided signals, using a plurality of first antenna elements comprising at least one first substrate and at least one ground conductor; and transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof.

Clause 20. The method of clause 19, wherein the second substrate is at least partially disposed between the active component set and the plurality of first antenna elements.

Clause 21. The method of clause 19 or clause 20, further comprising, in a first transmit mode:

conveying a first one the second guided signals from a first input/output of a front-end circuit (FEC), via a first power amplifier, to a first output/input of the FEC that is communicatively coupled to a first one of the at least one second antenna element; and conveying a first portion of the first one of the second guided signals at the first output/input to a second input/output of the FEC.

Clause 22. The method of clause 21, further comprising, in a second transmit mode:

conveying a second one of the second guided signals from the second input/output of the FEC, via a second power amplifier, to a second output/input of the FEC that is communicatively coupled to a second one of the at least one second antenna element; and conveying a second portion of the second one of the second guided signals at the second output/input to the first input/output of the FEC.

Clause 23. A user equipment (UE) antenna system comprising:

means for transducing first signals, of frequencies above at least 24 GHz, between first wireless signals and first guided signals, using a plurality of first antenna elements comprising at least one first substrate and at least one ground conductor; and means for transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof.

Clause 24. The UE antenna system of clause 23, wherein the second substrate comprises an L-shaped sheet comprising a first section, a second section extending substantially perpendicularly away from the first section, and a transition section connecting the first section to the second section, the first section at least partially overlapping with the means for transducing first signals, the means for transducing second signals being disposed at least partially on the transition section.

Clause 25. The UE antenna system of clause 24, further comprising means for transducing third signals, of frequencies above 8 GHz and below 24 GHz, between third wireless signals and third wired signals, the means for transducing third signals being disposed on the second section and coupled to the active component set.

Clause 26. The UE antenna system of any of clauses 23-25, further comprising:

means for conveying, in a first transmit mode, a first one the second guided signals from a first input/output of a front-end circuit (FEC), via a first power amplifier, to a first output/input of the FEC that is communicatively coupled to a first one of the at least one second antenna element; and means for conveying, in the first transmit mode, a first portion of the first one of the second guided signals at the first output/input to a second input/output of the FEC.

Clause 27. The UE antenna system of clause 26, further comprising: means for conveying, in a second transmit mode, a second one the second guided signals from the second input/output of the FEC, via a second power amplifier, to a second output/input of the FEC that is communicatively coupled to a second one of the at least one second antenna element; and means for conveying, in the second transmit mode, a second portion of the second one of the second guided signals at the second output/input to the first input/output of the FEC.

OTHER CONSIDERATIONS

Other examples and implementations are within the scope of the disclosure and appended claims. For example, configurations other than those shown may be used. Also, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) antenna system comprising:

an active component set configured to provide signals for wireless transmission, or configured to process wirelessly-received signals, or a combination thereof;

a plurality of first antenna elements communicatively coupled to the active component set and configured to transduce first signals, of frequencies above at least 24 GHz, between first wireless signals and first guided signals, the plurality of first antenna elements comprising at least one ground conductor and at least one first substrate, each of the plurality of first antenna elements comprising a first transducer; and at least one second antenna element communicatively coupled to the active component set and configured to transduce second signals, of frequencies within at least a portion of a frequency range between 8 GHz and 24 GHz, between second wireless signals and second guided signals, each of the at least one second antenna element comprising a second transducer disposed on a second substrate that at least partially overlaps the active component set and the at least one first substrate, or disposed on at least one of the at least one first substrate.

2. The UE antenna system of claim 1, wherein the second transducer is a monopole.

3. The UE antenna system of claim 2, wherein the second transducer is an inverted-F antenna.

4. The UE antenna system of claim 1, wherein the second transducer of each of the at least one second antenna element is disposed on at least one of the at least one first substrate and is laterally displaced from the first transducer of a respective one of the plurality of first antenna elements.

5. The UE antenna system of claim 1, wherein the plurality of first antenna elements are disposed in a linear array and the at least one second antenna element comprises two second transducers, each disposed proximate to a respective end of the linear array.

6. The UE antenna system of claim 1, wherein the second substrate is at least partially disposed between the active component set and the plurality of first antenna elements.

7. The UE antenna system of claim 1, wherein the at least one ground conductor is substantially disposed in a plane, the first transducer of each of the plurality of first antenna elements is disposed on a first side of, and separated from, the plane and the at least one second antenna element is disposed on a second side of the plane, opposite the first side of the plane.

8. The UE antenna system of claim 1, wherein the second substrate comprises a flexible sheet.

9. The UE antenna system of claim 1, wherein the second substrate comprises an L-shaped sheet comprising a first section, a second section extending substantially perpendicularly away from the first section, and a transition section connecting the first section to the second section, the first section at least partially overlapping with the plurality of first antenna elements, the at least one second antenna element being disposed at least partially on the transition section.

10. The UE antenna system of claim 9, further comprising at least one third antenna element disposed on the second section, the at least one third antenna element being communicatively coupled to the active component set and configured to transduce third signals between third wireless signals and third guided signals.

11. The UE antenna system of claim 1, wherein the second substrate includes a first portion at least partially overlapping with the plurality of first antenna elements and a second portion laterally displaced from the plurality of first antenna elements, and wherein the at least one second antenna element is disposed on the second portion of the second substrate.

12. The UE antenna system of claim 1, wherein the active component set comprises at least a portion of a first printed circuit board (PCB), wherein the plurality of first antenna elements comprise at least respective portions of at least one second PCB, and wherein the first PCB is physically connected to the at least one second PCB directly, or the first PCB is physically connected directly to the second substrate and the second substrate is physically connected directly to the at least one second PCB.

13. The UE antenna system of claim 12, wherein the active component set comprises a power amplifier for the at least one second antenna element.

14. The UE antenna system of claim 1, wherein the active component set comprises:

a first front-end circuit communicatively coupled to the plurality of first antenna elements;

a second front-end circuit communicatively coupled to the at least one second antenna element; and a single power management circuit communicatively coupled to the first front-end circuit and the second front-end circuit.

15. The UE antenna system of claim 1, wherein at least two first antenna elements of the plurality of first antenna elements share a single substrate.

16. The UE antenna system of claim 1, wherein the active component set, the plurality of first antenna elements, and the at least one second antenna element are disposed in a single physical module.

17. The UE antenna system of claim 1, wherein the at least one second antenna element comprises a plurality of second antenna elements and wherein the active component set comprises a front-end circuit (FEC), the FEC comprising a first input/output, a first output/input, a second input/output, and a second output/input, and configured to:

couple the first input/output, via a first power amplifier, to the first output/input that is communicatively coupled to a first one of the plurality of second antenna elements in a first transmit mode;

convey a first portion of a first one of the second guided signals at the first output/input in the first transmit mode to the second input/output; and couple, in a receive mode, the first output/input to the first input/output via a first low-noise amplifier, and the second output/input to the second input/output via a second low-noise amplifier.

18. The UE antenna system of claim 17, wherein the FEC is configured to:

couple the second input/output, via a second power amplifier, to the second output/input that is communicatively coupled to a second one of the plurality of second antenna elements in a second transmit mode; and convey a second portion of a second one of the second guided signals at the second output/input in the second transmit mode to the first input/output.

19. A method of transducing signals, the method comprising:

transducing first signals, of frequencies above at least 24 GHz, between first wireless signals and first guided signals, using a plurality of first antenna elements comprising at least one first substrate and at least one ground conductor; and transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof.

20. The method of claim 19, wherein the second substrate is at least partially disposed between the active component set and the plurality of first antenna elements.

21. The method of claim 19, further comprising, in a first transmit mode:

conveying a first one the second guided signals from a first input/output of a front-end circuit (FEC), via a first power amplifier, to a first output/input of the FEC that is communicatively coupled to a first one of the at least one second antenna element; and conveying a first portion of the first one of the second guided signals at the first output/input to a second input/output of the FEC.

22. The method of claim 21, further comprising, in a second transmit mode:

conveying a second one of the second guided signals from the second input/output of the FEC, via a second power amplifier, to a second output/input of the FEC that is communicatively coupled to a second one of the at least one second antenna element; and conveying a second portion of the second one of the second guided signals at the second output/input to the first input/output of the FEC.

23. A user equipment (UE) antenna system comprising:

means for transducing first signals, of frequencies above at least 24 GHz, between first wireless signals and first guided signals, using a plurality of first antenna elements comprising at least one first substrate and at least one ground conductor; and means for transducing second signals, of frequencies within at least a portion of a frequency range between 8 GHz and 24 GHz, between second wireless signals and second guided signals, using at least one second antenna element each comprising a transducer disposed on a second substrate that at least partially overlaps an active component set and the at least one first substrate, or disposed on at least one of the at least one first substrate, the active component set being configured to provide signals for wireless transmission, or configured to process wirelessly-received signals, or a combination thereof.

24. The UE antenna system of claim 23, wherein the second substrate comprises an L-shaped sheet comprising a first section, a second section extending substantially perpendicularly away from the first section, and a transition section connecting the first section to the second section, the first section at least partially overlapping with the means for transducing first signals, the means for transducing second signals being disposed at least partially on the transition section.

25. The UE antenna system of claim 24, further comprising means for transducing third signals, of frequencies above 8 GHz and below 24 GHz, between third wireless signals and third wired signals, the means for transducing third signals being disposed on the second section and coupled to the active component set.

26. The UE antenna system of claim 23, further comprising:

means for conveying, in a first transmit mode, a first one the second guided signals from a first input/output of a front-end circuit (FEC), via a first power amplifier, to a first output/input of the FEC that is communicatively coupled to a first one of the at least one second antenna element; and means for conveying, in the first transmit mode, a first portion of the first one of the second guided signals at the first output/input to a second input/output of the FEC.

27. The UE antenna system of claim 26, further comprising:

means for conveying, in a second transmit mode, a second one the second guided signals from the second input/output of the FEC, via a second power amplifier, to a second output/input of the FEC that is communicatively coupled to a second one of the at least one second antenna element; and means for conveying, in the second transmit mode, a second portion of the second one of the second guided signals at the second output/input to the first input/output of the FEC.

* * * * *